United States Patent
Pompidor et al.

[11] 3,962,766
[45] June 15, 1976

[54] PROCESS FOR ASSEMBLING TUBES OF PLASTICS MATERIAL AND ASSEMBLIES RESULTING FROM SAID PROCESS

[75] Inventors: Guy Pompidor; Jean-Luc Serriere, both of Pont-a-Mousson, France

[73] Assignee: Pont-A-Mousson S.A., Nancy, France

[22] Filed: May 31, 1974

[21] Appl. No.: 475,227

[30] Foreign Application Priority Data
June 8, 1973  France .............................. 73.20913

[52] U.S. Cl. ........................ 29/157.3 B; 264/230; 264/248; 264/259; 264/271; 264/280; 264/288; 264/296; 264/320; 264/345; 29/157.3 D; 156/215; 156/244; 156/213; 156/306; 156/468; 156/475; 156/500; 228/157; 228/173; 228/183; 264/209; 264/210 R

[51] Int. Cl.² ............... B21D 53/02; B29C 27/22; B29D 23/04

[58] Field of Search .......... 264/209, 210, 230, 249, 264/248, 250, 251, 254, 259, 271, 280, 291, 294, 296, 177, 290; 156/196, 210, 222, 244, 306, 213, 215, 468, 475, 500; 29/157.3 C, 157.3 R, 157.3 D, 202 R; 165/151, 152, 171, 180, 183

[56] References Cited
UNITED STATES PATENTS

| | | |
|---|---|---|
| 2,717,424 | 9/1955 | Francis et al. ........................ 264/210 |
| 3,158,181 | 11/1964 | Gore ............................... 29/157.3 R |
| 3,296,661 | 1/1967 | Moustier ............................. 264/209 |
| 3,379,241 | 4/1968 | Gau ..................................... 165/171 |
| 3,382,121 | 5/1968 | Sherlock ............................. 264/230 |
| 3,435,893 | 4/1969 | Withers................................ 264/248 |
| 3,526,683 | 9/1970 | Heslop et al. ...................... 264/230 |
| 3,577,496 | 5/1971 | Hoffman ............................. 264/230 |
| 3,643,805 | 2/1972 | Hoffman ............................. 264/261 |
| 3,666,587 | 5/1972 | Nagao ................................. 156/222 |
| 3,730,959 | 5/1973 | Horres et al. ....................... 264/263 |

*Primary Examiner*—Willard E. Hoag
*Attorney, Agent, or Firm*—Sughrue, Rothwell, Mion, Zinn & Macpeak

[57] ABSTRACT

Tubes of thermoplastic material having an elastic memory are assembled with radiating plates of a heat exchanger by:
 longitudinally drawing the tubes at a first temperature in the neighborhood of the softening point of said material so as to reduce their transverse dimensions;
 cooling said tubes to the ordinary temperature while maintaining the drawing force;
 putting the tubes and the plates in their desired relative positions;
 bringing the assembly to said first temperature so that the tubes can resume their initial transverse dimensions.

6 Claims, 8 Drawing Figures

PROCESS FOR ASSEMBLING TUBES OF PLASTICS MATERIAL AND ASSEMBLIES RESULTING FROM SAID PROCESS

The present invention relates to a process for assembling tubes of plastics material and more particularly a process for assembling a nest of parallel tubes, composed of a thermoplastic material having an elastic memory, with radiating plates in a heat exchanger.

The process according to the invention comprises:

longitudinally drawing the tubes at a first temperature in the neighbourhood of the softening point of said material so as to reduce their transverse dimensions;

cooling said tubes to the ordinary temperature while maintaining the drawing force;

putting the tubes and the plates in their final relative positions;

bringing the assembly to said first temperature so that the tubes can resume their initial transverse dimensions.

Such a process for assembling is made possible by the special properties of thermoplastics materials having an elastic memory, that is to say they may be deformed mechanically in the hot state and cooled while maintaining the deforming force, these materials resuming their shape and their initial dimensions when they are subjected to a new rise in temperature and the stresses or strains produced in the course of the deformation are relieved. In this way very strong assemblies are obtained with no exterior fixing member.

Another object of the invention is to provide a heat exchanger of the type comprising a nest of parallel tubes and radiating plates assembled with said tubes, wherein the tubes are of a thermoplastic material having an elastic memory and are assembled with the plates by a process as defined hereinbefore.

Further features and advantages of the invention will be described from the ensuing description with reference to the accompanying drawings.

Figure 1:
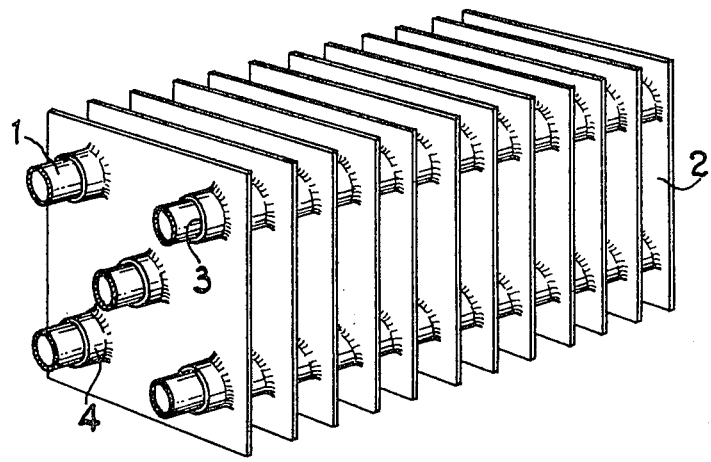
FIG. 1 is a partial view of a heat exchanger according to the invention.

The heat exchanger shown in FIG. 1 comprises a nest or group of parallel tubes 1 of cross-linked polyethylene which are cylindrical and have a circular cross-sectional shape combined with metal radiating plates 2 which are perpendicular to the axes of the tubes 1. The plates 2 have as many circular apertures 3 as there are tubes 1 and each tube extends through the corresponding apertures 3 of all the plates 2 while conforming to their contour. Annular projecting portions 4 surrounding the apertures 3 and forming an integral part of the material of the plates 2, ensure that the plates are spaced apart equal distances.

Figure 2:
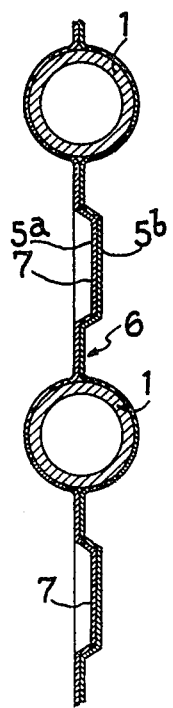
FIG. 2 is a partial cross-sectional view of a second embodiment of a heat exchanger according to the invention.
Figure 3:
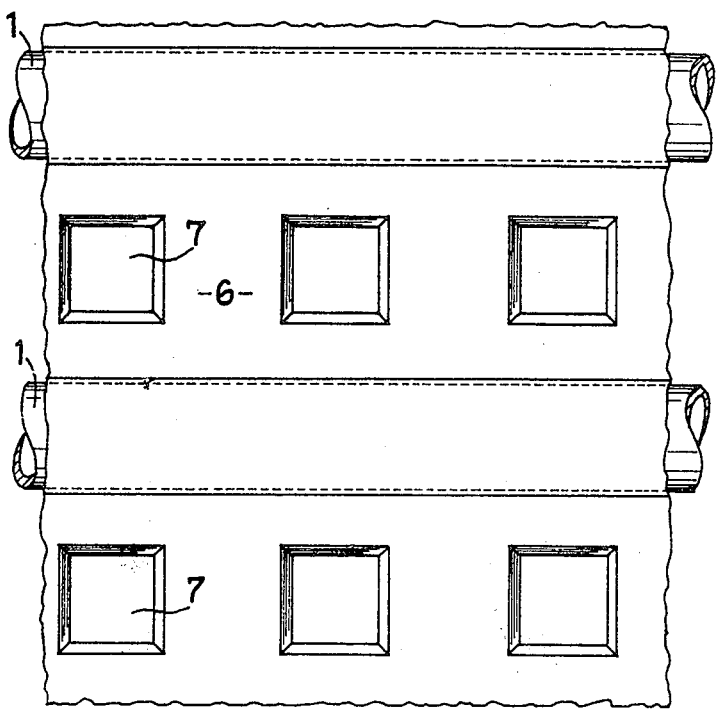
FIG. 3 is a partial side elevational view of the heat exchanger shown in FIG. 2.

The heat exchanger shown in FIGS. 2 and 3 also comprises a nest of parallel tubes 1, all these tubes being contained in the same plane. Two radiating metal plates $5^a$ and $5^b$ are applied to each side of the tubes 1, conform to the shape of the tubes and are interconnected in regions 6 separating the tubes 1. In order to improve the efficiency of this heat exchanger, projecting portions 7 which are formed by a press operation are provided in spaced-apart positions in the regions 6. The heat exchanger is obtained by a process which will now be described with reference to FIGS. 4–6.

Figure 4:
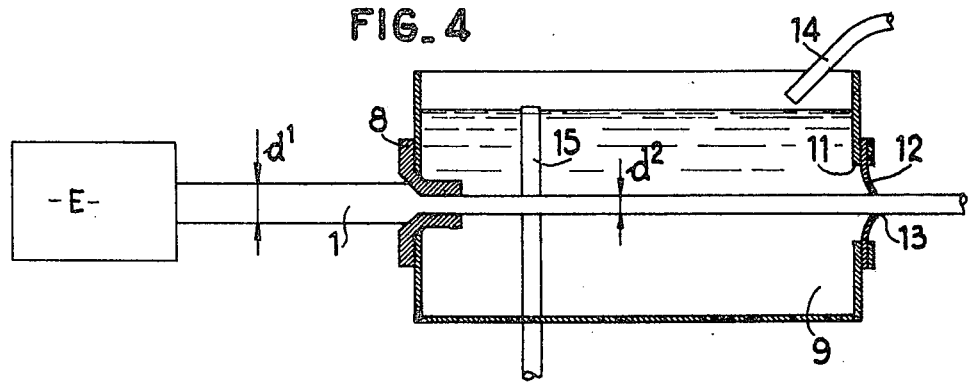
FIG. 4 is a diagrammatic sectional view illustrating the first stage of an assembling process according to the invention.
Figure 5:
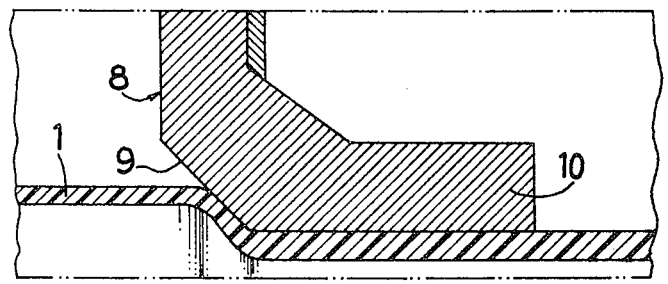
FIG. 5 is a sectional view to an enlarged scale of a detail shown in FIG. 4.

As can be seen in FIG. 4, the tubes 1 issuing in the cross-linked state from an extruder E, such as that described in French Patent No. 1,538,988, have a diameter $d^1$ and a temperature of the order of 180°–230°C and pass horizontally through coaxial die heads 8 at the output of the extruder E then through a cooling tank 9. The distance between the output of the extruder E and the input of the die heads 8 is such that each tube 1 at the entrance of the corresponding die heads has a temperature between 120° and 150°C which is in the neighbourhood of the melting point of the crystallites of the cross-linked polyethylene constituting the pipes or tubes 1. This is the temperature, in the neighbourhood of the softening point of this material, at which the latter changes from a transparent appearance, for the higher temperatures, to a milky appearance for the lower temperatures. As can be seen better in FIG. 5, the die head 8 comprises a conical counter-sinking 9 which has a maximal diameter exceeding the diameter $d^1$ and which is extended by a cylindrical part 10 having a diameter $d^2$ less than $d^1$. The tubes 1 are therefore subjected to a constriction, their diameter being brought from $d^1$ to $d^2$ which developes the stresses or strains in the mass of polyethylene.

The cooling tank 9 comprises, for each tube, an input aperture constituted by the die head 8 and an output aperture 11 on which is fixed an elastically yieldable diaphragm 12 having on the axis of the die head 8 an aperture 13 whose diameter is less than the diameter $d^2$. This cooling tank is also provided with a water supply pipe 14, located near to an output aperture 11 of the tank 9 and an overflow pipe 15 located in the vicinity of a die head 8. There is thus produced in the tank 9 a continuous stream of water at ambient temperature, for example of the order of 15° to 20°C, in a direction opposed to the direction of displacement of the tubes 1. Each tube 1, in leaving the corresponding die head 8 is therefore cooled with a diameter $d^2$ which "gels" the stresses previously created in the mass of the polyethylene. It maintains this diameter $d^2$ and issues from the cooling tank 9 by way of the aperture 13 of the corresponding elastically yieldable diaphragm 12 which, owing to the fact that it has a diameter less than the diameter of the tube, ensures the liquid-tightness of the passage through the tank wall.

Figure 6:
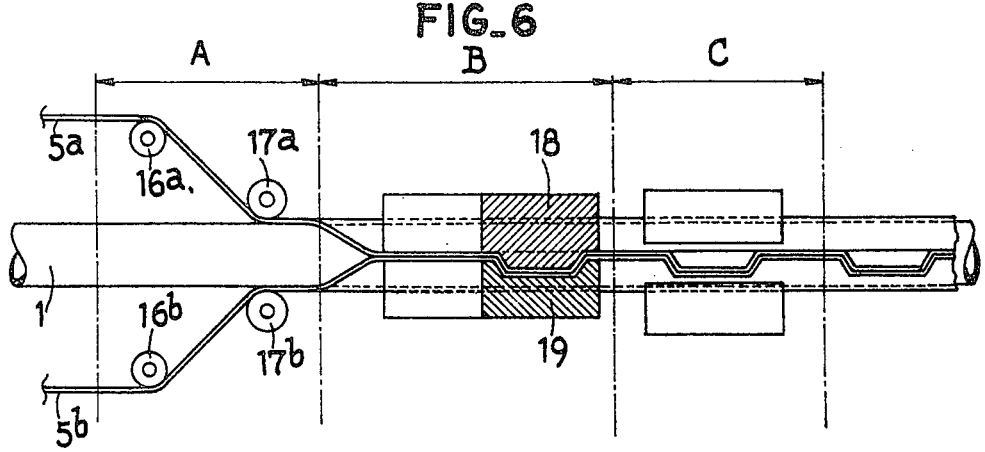
FIG. 6 is a diagrammatic view of the subsequent stages of an assembling process according to the invention.

FIG. 6 shows the following stages leading to the obtainment of the heat exchanger shown in FIGS. 2 and 3. The tubes 1 travel in succession through a station A supplying radiating plates, a station B for press-forming the plates, and a heating station C. The two radiating plates $5^a$ and $5^b$, which have a thickness of a few tenths of a millimeter, travel toward the station A in a direction parallel to the tubes 1 at an equal distance above and below the tubes. Each plate passes through two series of rolls 16a–17a or 16b–17b which bring it in contact with respectively the upper and lower generatrices of the tubes 1. In the press-forming region B located immediately downstream of the station A the radiating plates 5$^a$ and 5$^b$ are fed on one hand into contact with the tube 1 and, on the other hand, into contact with each other in the regions 6 between the tubes and are secured together in the regions 6 for example by welding or adhesion. Thus, the tubes 1 are slightly clamped in recesses formed of two half-cylinders whose diameter is roughly equal to $d^2$. Tools 18–19 of suitable shape thereafter form the reliefs or recesses 17 of the plate. The disposition of the tubes and the plates is then that shown in FIGS. 2 and 3.

The pre-assembled tubes and radiating plates then travel to the heating station C where they are brought to the aforementioned temperature in the neighbourhood of the melting point of the crystallites, which is also the temperature of activation of the elastic memory of the cross-linked polyethylene constituting the tubes. These tubes therefore tend, at this temperature, to resume their initial diameter by the release of the stresses or strains created at the moment of the passage of the tubes through the die heads 8. There is therefore produced a radial expansion of the tubes 1 which is the greater as the stay in the heating station C is long. As the two radiating plates 5$^a$ and 5$^b$ are fixed together this expansion produces a clamping of the tubes between the two plates. When the assembly issues from the heating station C and cools, the tubes 1 retain the diameter reached in this heating station C. The assembly is strong and durable.

The heat exchanger shown in FIG. 1 is assembled in the following manner:

After having been, as before, drawn in the hot state and cooled, the tubes 1 are cut off to a length which is slightly greater than the desired length and then introduced in the apertures 3 of a stack of radiating plates. These apertures 3 have a diameter slightly less than the diameter of the tubes 1. Upon heating to the aforementioned temperature the tubes 1 tend to resume their initial diameter and therefore bear very tightly against the walls of the apertures 3.

Figure 7:
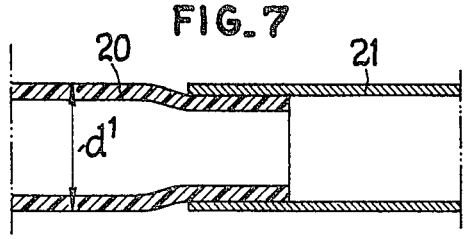
FIG. 7 is a sectional view of a joint between two tubes, said joint being obtained by means of a process according to the invention.

FIG. 7 shows the use of the elastic memory of cross-linked polyethylene for the assembly of a tube 20 of this material and a second coaxial tube 21 which has a diameter at the most equal to the initial diameter $d^1$ of the first tube. One end of the first tube 20, brought to the diameter $d^2$ as described before with respect to FIG. 4, is inserted in the end of the second tube 21 and the end thus introduced is heated to the aforementioned temperature. This end expands radially and highly grips against the inner wall of the second tube.

Figure 8:
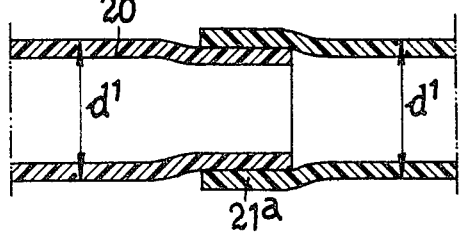
FIG. 8 is a sectional view of another joint between two tubes also obtained by means of a process according to the invention.

The joint shown in FIG. 8 differs from the preceding joint in that the second tube 21$^a$ is also of cross-linked polyethylene and therefore also provided with an elastic memory and has the same initial diameter as the first tube. The end of this tube has been previously radially expanded at the aforementioned temperature and then cooled at the surrounding temperature while maintaining this expansion. Thus, when the common part of the tubes is equal to the aforementioned temperature, the first tube expands radially and the second tube shrinks radially, the two tubes tending to resume the same initial diameter $d^1$. The tightening effect is therefore still more effective than in the case of the joint shown in FIG. 7.

A particularly interesting modification of the assembly processes described hereinbefore consists in producing a weld between the part of the tube to be assembled and the element surrounding this part by interposing therebetween a thin layer of a plastics material which is meltable at the heating temperature and compatible with the cross-linked polyethylene of this tube and with the material of said element. In the case where the material of this element is also of cross-linked polyethylene, in particular in the case shown in FIG. 8, this thin layer may be, for example, of polyethylene of high, medium or low density or non-cross-linked or slightly cross-linked, that is to say have a cross-linking rate less than 50%. The relieving of the stresses or strains in the heated part of the tube ensures an effective and well-distributed tightening in the welded region, this tightening requiring no ring or other exterior member.

In the described embodiments the tubes have a circular section. They may of course have any section, for example a polygonal section, and in this case they will be assembled with elements having apertures of the same shape.

Having now described our invention, what we claim as new and desire to secure by Letters Patent is:

1. Process for manufacturing a heat exchanger having parallel tubes and radiating plates assembled with the tubes, comprising
    simultaneously extruding in extruders a series of coplanar laterally spaced-apart parallel tubes of thermoplastic material having an elastic memory;
    simultaneously drawing by pulling the extruded tubes through die heads coaxial with the outlets of the extruders and having a cross-sectional size less than the cross-sectional size of the tubes issuing from the extruders, the tubes being cooled down to a temperature in the neighbourhood of the softening point of said material before entering the die heads;
    simultaneously passing the tubes issuing from the die heads through a cooling tank while maintaining the pulling force on the tubes;
    feeding two radiating plates on both sides of the series of tubes issuing from the tank in contact with opposed generatrices of the tubes;
    press-forming the two plates so that the plates conform to the shape of the tubes and come in contact with each other in regions thereof corresponding to the lateral spaces between the tubes;
    fixing the plates together in said regions, and reheating the assembly of the tubes and the plates to said temperature.

2. Process claimed in claim 1, wherein the tubes are cooled to said temperature by placing the die heads at a suitable distance from the outlets of the extruders.

3. Process claimed in claim 1, further comprising forming reliefs in said regions before bringing the assembly to said temperature.

4. Process claimed in claim 1, wherein the plates are fixed together by welding.

5. Process claimed in claim 1, wherein the plates are fixed together by adhesion.

6. Process claimed in claim 1, wherein the thermoplastic material is cross-linked polyethylene.

* * * * *